Sept. 22, 1942.     B. D. EMANUEL     2,296,778
BATTERY ASSEMBLY
Filed May 24, 1939     3 Sheets-Sheet 3
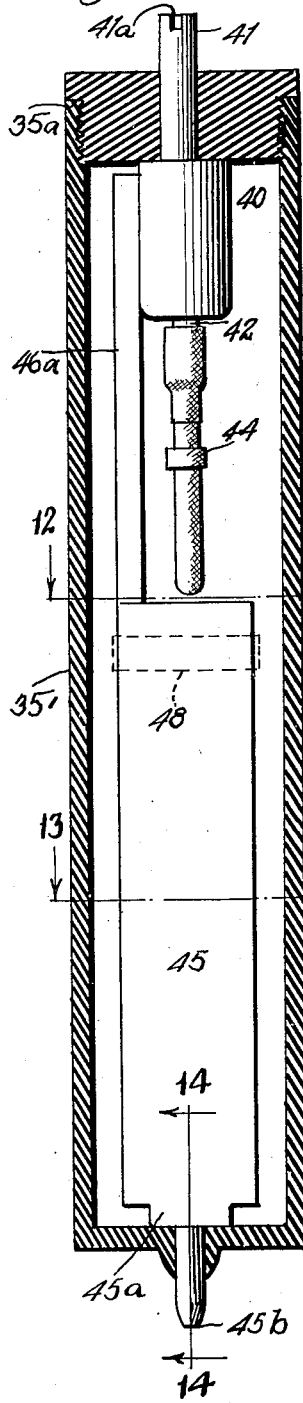
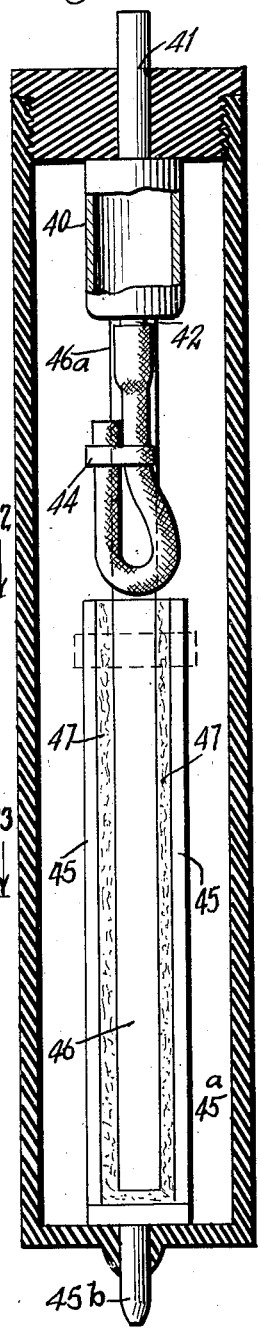
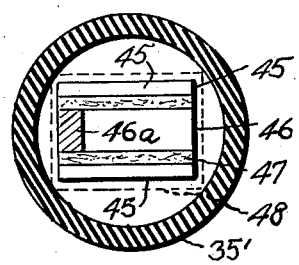
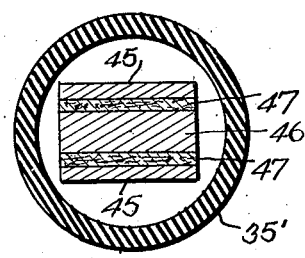
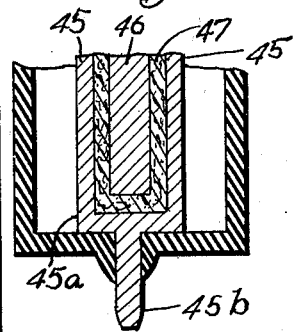

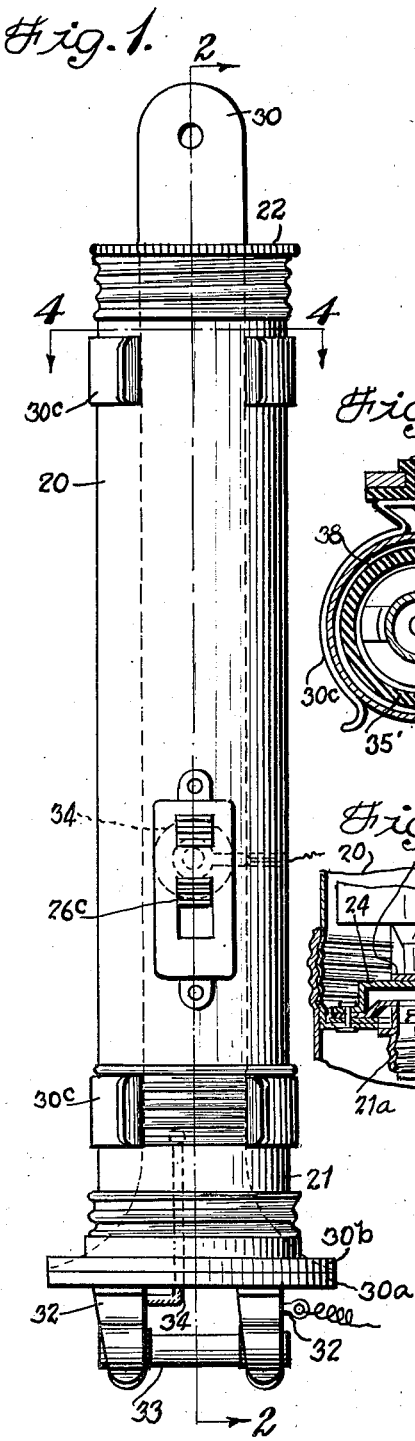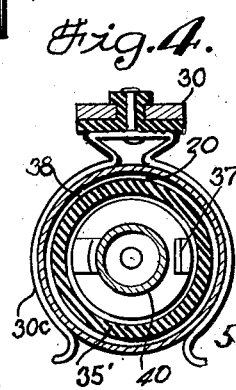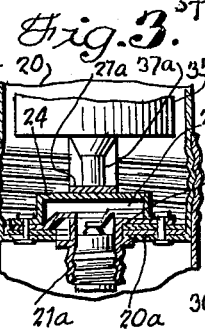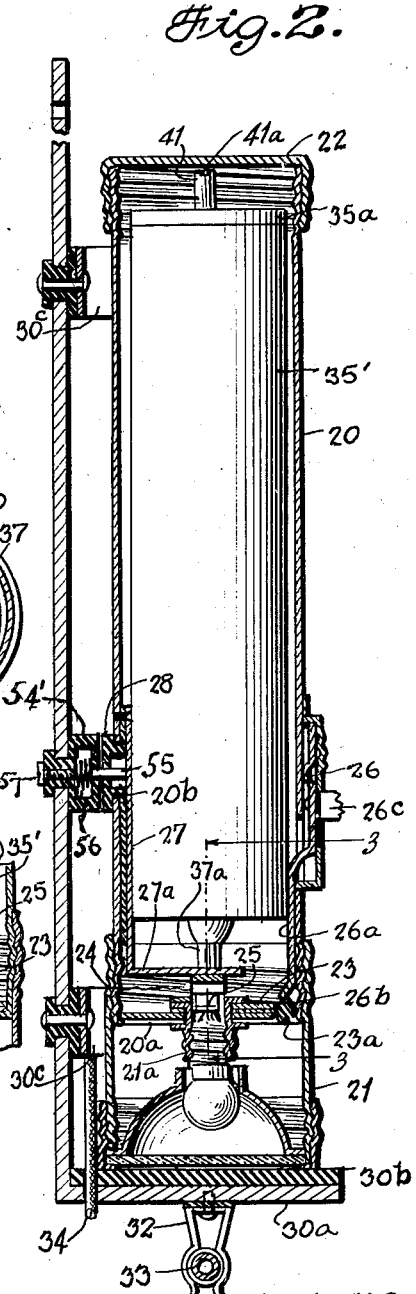

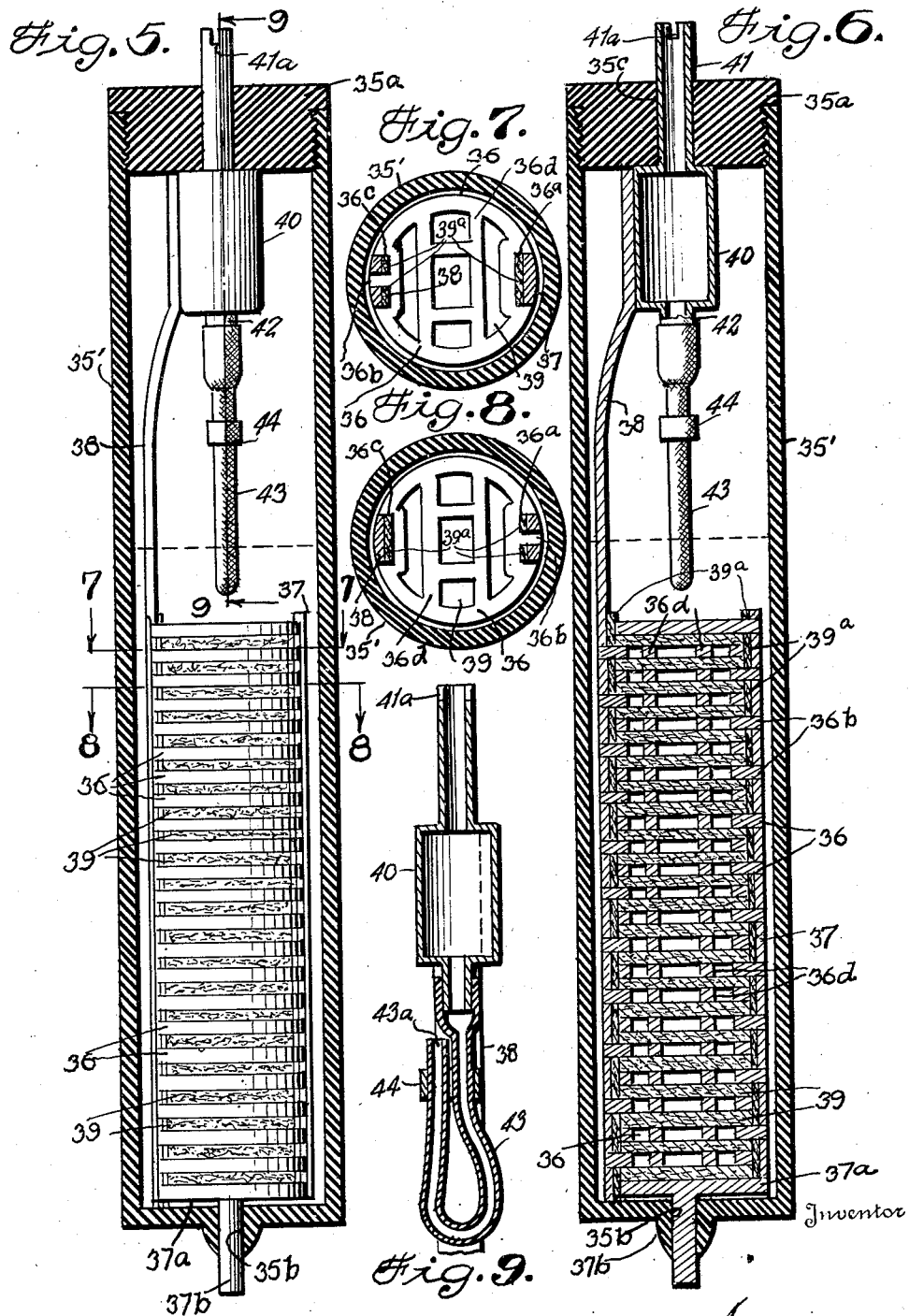

Patented Sept. 22, 1942

2,296,778

UNITED STATES PATENT OFFICE 2,296,778

BATTERY ASSEMBLY

Benjamin D. Emanuel, Anderson, Ind.

Original application April 25, 1938, Serial No. 204,239, now Patent No. 2,293,284, dated August 18, 1942. Divided and this application May 24, 1939, Serial No. 275,524

5 Claims. (Cl. 136—6)

This invention relates to improvements in battery assemblies and their construction, and pertains more particularly to assemblies designed for service in lighting assemblies of the type designed for portable service especially in the field of portable structures generally termed "flashlights." The present application is a division of that filed by me April 25, 1938, Serial No. 204,239, now Patent No. 2,293,284 granted August 18, 1942, and a continuation in part of my application filed March 20, 1939, Serial No. 263,004, now Patent No. 2,266,686, granted December 16, 1941.

Flashlight structures have been known for many years and have reached a commercial development of world-wide extent—they are generally considered as a necessity in the varied activities of human life. The commercial development, however, has been based generally on structures which utilize dry-cell batteries, which, because of the small current values needed, have given efficient service and since production of these is of low cost characteristic, such type has been made more or less standard in this particular field.

Efforts have been made to enter this field by the substitution of batteries of the rechargeable type for those of the dry-cell type, a substitution which is desirable in certain respects, but the efforts have met with indifferent success, due to the changed conditions which such substitution would provide. The substitution advantages would permit a more efficient flash-light operation and avoid the necessity of frequent substitution of batteries; but the necessity of re-charging of the battery to retain battery efficiency sets up problems of a different nature—bearing on the need of bringing the battery to a charging station, etc.—with the result that the public has not been led to make this substitution generally, especially in this particular field. Such substitution is readily had—as evidenced by the miner's lamp art—where the service to be performed by a plant is sufficiently large and so frequent as to warrant the use of a charging station and its attendants, in which case the practice has been to remove the batteries for charging, thus making the substitution that of simply substituting one battery type for the other. But with individual flashlight usage, these conditions become onerous, and have been generally unacceptable to the public.

Efforts have been made to overcome the conditions by structures in which the battery was re-charged in situ, but the problems involved in doing this have been somewhat difficult for various reasons, since it becomes necessary to provide charging circuit connections within a closed flashlight casing, prevent battery overcharging, etc.

The nearest approach to a feasible structure of a portable flashlight operating with a rechargeable battery is that presented in the patent in Blake, No. 1,999,079, April 23, 1935, in which the battery is contained within the casing of the light and is charged in situ. The disclosure of the patent reaches in the direction of the substitution of the rechargeable battery for the dry-cell battery in this particular field under conditions in which individual usage can form the basis of action. However, the disclosure is not completely satisfactory, due to the fact that the battery showing is more or less conventional, and therefore fails to present a solution to a number of the problems found to be present in an attempt to meet the conditions for which the structure is designed.

One of these problems is set up during the charging operation. During this period it is inevitable that gases will be developed within the battery, and these must be released. Where the battery is removed for charging, as in the miner's lamp, the battery may have an opening for such release and this can be closed before the battery is restored, thus preventing loss of the electrolytic fluid. Where, however, the battery is charged in situ, the gas release means must remain as a permanent part of the battery assembly, and this sets up the conditions of a possible leakage point of fluid, due to the fact that the light, in use, is placed at all angles, thus opening up the possibility of leakage conditions. The Blake disclosure does not present a specific solution to this problem—due to the use of a special form of battery (not disclosed); through experimentation, the contemplated battery of Blake was found to be unacceptable as a solution to this problem when the flashlight is subjected to a number of the conditions met in service.

The present invention thus reaches into the special field for which the Blake disclosure was designed, but through the development of a special type of battery and a simplification of the structure, as well as the addition of a particular form of charging structure, permits the desired substitution of re-chargeable for dry-cell batteries in this particular field of flash-light service, doing this through solution of a number of problems which remained unsolved in the Blake disclosure.

The present invention therefore has for its principal object the production of a lighting assembly of this type in which the flash-light is capable of its varied service conditions; in which the battery is rechargeable without requiring attention—by simply positioning it on its support when not in use; in which the light can be maintained in service over extended periods under maximum efficiency conditions, and yet be restored to maximum value conditions during periods when the light is not in service; in which the life of the battery is extensive but in which the battery can be replaced in simple manner; in which the charging cost is minimum and provided without damage to the battery, thus greatly reducing the maintenance cost of the lighting unit. Other objects are the production of a battery unit of overall dimensions readily received within the dimensions of the standard flashlight units, and yet provide for efficient current supply for the lighting bulb; which can be readily recharged without damage while in its normal position within the lighting unit; the formation of a battery with a special type of plate assembly of maximum efficiency; the provision of an efficient venting unit with the latter providing one of the battery terminals. In addition, the invention contemplates the production of a lighting assembly of this type which can serve as a substitute for the commercial dry-cell flashlight service; which can be produced at low cost; which is simple and efficient in operation; and in which service maintenance costs are extremely low.

To these and other ends, therefore, the nature of which will be readily understood as the invention is hereinafter disclosed, said invention consists in the improved construction and combination of parts hereinafter more particularly described, illustrated in the accompanying drawings, and more particularly set forth in the appended claims.

In the accompanying drawings, in which similar reference characters indicate similar parts in each of the views—

Figure 1 is a view in front elevation of a lighting assembly of the general type of the present invention, the flashlight being positioned on the charging bracket, Figure 2 is a vertical section taken on line 2—2 of Figure 1, with the battery shown in elevation, Figure 3 is a fragmentary longitudinal section taken on line 3—3 of Figure 2, Figure 4 is a cross-sectional view, taken on line 4—4 of Figure 1, Figure 5 is a view of one form of battery, the battery casing being shown in longitudinal section with the internal non-liquid content shown in elevation, Figure 6 is a view of the battery of Figure 5, with the internal non-liquid content also in section longitudinally of the battery, Figures 7 and 8 are detail cross-sections taken on lines 7—7 and 8—8 respectively of Figure 5, Figure 9 is a detail longitudinal section of a preferred form of venting unit terminal, Figures 10 and 11 are views corresponding to Figures 5 and 6, respectively, but illustrating a different type of plate assemblage, Figures 12 and 13 are detail cross-sectional views taken respectively on lines 12—12 and 13—13 of Figure 10, Figure 14 is a fragmentary longitudinal section taken on line 14—14 of Figure 10.

The lighting assembly of the present invention comprises a flashlight unit and a charging bracket unit, the latter being designed to form the support for the flashlight unit when the latter unit is not being put into service. For instance, the light might be carried about ready for activity when needed—inspection service is an example—and used intermittently during such period, thus making the period a service period; at other times, the invention contemplates the positioning of the light unit on the charging unit. This association of the two units is designed for the purpose of maintaining the battery of the lighting unit in charged status as far as possible. The battery of the lighting unit is designed to permit continuous service for a number of hours, a time length that is considerably greater than normal flashlight service generally contemplates, so that it is generally the case that complete battery depletion is not actually present at the end of the service period. If, therefore, the lighting unit is placed on the charging unit at the close of the service period, re-charging can take place until a succeeding service period requires lighting unit service, thus replenishing the battery without requiring any particular attention on the part of the user. The battery depletion during a service period is generally so small that a very low charging rate can be employed for re-charging without likelihood of overcharging the battery over extended periods of idleness.

To permit a result such as this, it is essential that both units have particular characteristics. For instance, the charging unit must be capable of providing the charging action whenever the lighting unit is in position, and yet do this without overcharging the battery. This is obtained by arranging the charging unit in such way that in positioning the lighting unit a charging circuit is automatically established; by positioning a high resistance in that circut, the rate is maintained very low. For the purpose of illustration, one service of the lighting unit is that of a trouble light in motor vehicle service; a direct-current storage battery of six volts is generally used with motor-vehicle service, and this is connected up to the charging unit, with a resistance of 50 or 150 ohms in the line, the resistance value depending on the extent of use of the lighting unit—the smaller value being used where the unit is in daily use and the higher value where the unit use is only occasional.

Not only must the charging unit be arranged to provide the result, but the lighting unit must be arranged to meet the conditions set up through the fact that re-charging of battery is to be had. Not only must the battery be capable of functioning as the power source for the lamp of the unit over extended periods, but must also be capable of being re-charged under conditions such as above. Ebullition in the battery with evolvement of gas takes place during re-charging, and this must be permitted during the charging period, and yet prevent the escape of electrolyte during use of the lighting unit under all condtions of service. While this condition is readily secured where space conditions are more or less unlimited and where the battery is of the one-position type, the fact that the lighting unit is itself of the flashlight type and must be capable of flashlight-service and is of dimensions similar to commercial flashlights of the dry-cell type, it is obvious that the limited space conditions present difficulties such as to require special characteristics in the elements of the lighting unit itself.

Referring to Figs. 1 to 4, the light unit includes an elongated tubular metallic casing 20 of desired length, the casing having its opposite ends threaded to receive the lamp section 21 at one end and the closure 22 at the opposite end. The lamp section includes the usual casing, lamp, reflector, lens, etc., with the usual arrangement of terminals, one of which includes the connection of the lamp socket with the casing; the connections to one of the lamp or bulb terminals include a make and break device, thus conforming to the general practice present in flashlights utilizing dry cell batteries. However, certain modifications are essential due to the fact that provision must be made for charging the battery while the latter remains within the casing.

The specific structure of the lamp section may be of any desired form, the form shown being more or less illustrative, being based upon one type of commercial flashlight structure of the dry cell type. In this showing, the lamp socket, indicated at 21a, is shown as carried by a diaphragm 20a, supported by casing 20, the socket being insulated from the diaphragm. The diaphragm also carries a terminal 23, having a lip 23a, this terminal having contact with the socket, but insulated from the diaphragm and from a bridge member 24 and terminal 25, also carried by the diaphragm but insulated therefrom, terminal 25 being adapted to contact the usual teat contact of the lamp bulb, while the socket reaches to the opposite terminal of the bulb as is usual. Casing 20 is shown as carrying a slidable make and break element 26, the latter including a spring arm 26a having a lip 26b adapted to be moved into and out of contact with lip 23a by movements of a suitable actuator 26c. Assuming that bridge member 24 is contacting the negative terminal of a battery, with the casing contacting the positive terminal of the battery, it will be understood that when lips 23a and 26b are in contact engagement, a circuit between battery and bulb will be established; when the lips are separated, this circuit is broken between the battery positive terminal and the lamp socket, leaving the battery negative terminal in circuit-make relation with the terminal 25.

This arrangement of lamp section is adapted for service in the assemblage of the present invention, by utilizing a charging terminal 27 in interposed relation between the bridge member 24 and the negative battery terminal, the charging terminal having carried internally of and insulated from the casing, and having an angular portion 27a which extends beneath the bridge 24, remaining in permanent contact therewith; the negative battery terminal contacts with the angular portion 27a and the latter thus forms a part of the lamp bulb circuit whenever lips 23a and 26b are in contact engagement; the bulb circuit is broken when the lips are out of engagement, thus rendering the bridge member 24 inactive, but retaining the charging terminal 27 in contact engagement with the negative battery terminal; if, therefore, terminal 27 be operatively connected with a charging circuit, the latter circuit will be completed through the battery, leaving the bulb inactive due to the break in the bulb circuit at the lips 23a and 26b.

Charging terminal 27 is secured to the interior of casing 20 and insulated therefrom, the casing carrying an opening 20b overlying terminal 27, the opening receiving an insulating bushing 28, the opening of which permits of the entrance of a contact—presently described—carried by the lamp supporting unit. During charging, the bulb circuit is retained broken at lips 23a and 26b, thus preventing bulb activity during charging and preventing short-circuiting of the charging circuit through the bulb.

The charging unit, shown in detail in Figs. 1 to 4, is in the form of an angular bracket 30, secured at a desired point by suitable means, the base member 30a projecting forwardly and carrying an insulating pad 30b upon which the flashlight rests, the preferred arrangement placing the bulb end of the flashlight at the lower end during charging, as indicated in Figs. 1 and 2; the flashlight thus being inverted during this period. The bracket carries a pair of supporting clips 30c insulated from the bracket, as indicated, these clips receiving the body portion of the flashlight. The bracket base member 30a carries a pair of depending clamping clips 32 insulated from the base and adapted to receive and support a removable resistance element 33, of desired resistance value; one end of the resistance has an operative connection with one of the charging battery terminals (not shown), the opposite end of the resistance being operatively connected with the lower of the two clips 30c, as by a connection 34—these connections may, if desired, reach to the clips 32 with the latter then engaging the opposite ends of the resistance element 33, thus permitting substitution of resistance elements without effecting the charging circuit connections with the charging battery.

The bracket 30, opposite openings 20b, carries a suitable contact adapted to engage terminal 27 when the flashlight is in its charging position. The contact may be of suitable type, the drawing indicating a small casing 54' carried by the bracket and which supports a contact 55 yieldably supported by a spring 56 mounted within the casing 54' with the latter of insulating material; the bracket carries a suitable terminal—such as screw 57—insulated from the bracket, and to which the connection to the opposite side of the charging battery is secured. The latter connection reaches to the negative terminal of the battery being charged, through the terminal 27 which is yieldingly engaged by contact 55 when the flashlight is placed in position on the support; the positive terminal of the battery being charged being reached through the lamp casing 20 from the lower clip 30c. Contact 55, being yielding, can provide efficient engagement with the positioned terminal 27 without affecting the latter within casing 20.

As pointed out above, the resistance value of the resistance element 33 may be as desired or found necessary. This element is designed to control the rate of charging of the battery to be charged; where the flashlight is being used infrequently, the rate of charging can be materially reduced with an assurance of efficient action, while daily service of the light would require a higher charging rate. As example, it may be stated that if the lamp is used daily, a preferred resistance value would be approximately 50 ohms; where the service is infrequent, the value may be increased, for instance, to 150 ohms; these values are illustrative only, and will depend upon the value of the charging source. If the charging is to be from an electric light circuit, an additional controlling device would be inserted in the connections as is usual in cases where the voltage is to be stepped down.

The battery employed is disclosed in the general types, these differing as to the structure of the plate asembly. In one type the plates extend transversely of the axis of the battery—in the other type the plates extend longitudinally of the battery. Either type can be employed, but because the transverse arrangement enables a largely increased plate surface, this particular type is preferred, and will first be described, this being disclosed in Figs. 5 to 9.

The battery casing 35' is tubular with one end closed, the opposite end being internally threaded to receive a threaded closure 35a. The casing and closure are formed of suitable material not affected by the electrolyte—hard rubber, or one of the materials of phenolic source may be employed, being similar to the materials generally used in battery casing structures. The casing must be received within the body of the flashlight casing and yet have dimensions capable of receiving the required internal structures and the electrolyte; hence the casing is of small diameter as compared with its length. The closed end of the casing 35' is formed with an opening 35b for the passage of the negative terminal of the plate assembly, while the closure 35a is formed with an opening 35c for the passage of the positive terminal of the assembly. The openings are arranged leakage-proof with respect to the terminals; in practice, the batteries are arranged for service over an extended period—a year for instance—of heavy-duty service, and are designed to be replaced, with the used battery returned to the manufacturer to be re-conditioned for another period of service; consequently, the particular packing used will be such as will enable ready disassembly for reconditioning purposes.

The plate assembly in this type of battery is made up of a succession of grid plates 36, with each plate of skeleton type, and secured to opposing carriers 37, 38, located at opposite sides of the assembly, the arrangement being such that a plate is secured to one of the carriers while the two adjacent plates are secured to the other carrier, thus having alternate plates carried by the same carrier. The carriers extend longitudinally of the casing, and are generally similar within the zone of the plate assembly, the plates being arranged to permit this arrangement. For instance, each plate, while generally circular, has its contour at one side arranged with a recess 36a, the inner wall of which carries a projection 36b designed to be secured in suitable manner within an opening of the carrier, as by soldering, the carrier extending into the recess; the plate is thus directly connected with such carrier. On the diametrically opposite side of the plate the latter is formed with a second recess 36c which is designed to receive the other carrier and its insulation 39a. Hence, the grid plates may be uniform as to shape and be capable of being secured to either carrier, the latter having their openings arranged so that adjacent plates will be secured to opposite carriers and yet have an assembly insulated relation with the carrier to which it is not connected, to thereby prevent undue stress on the securing projections 36b. The plate includes parallel bars 36d to complete a grid effect, the plate being designed to receive the usual or any preferred "paste" that is employed in completing battery plates. Since carrier 37 extends into recess 36a of one group of plates and into recess 36c of the other group of plates (the opposite recess of each plate receiving the carrier 38), the carrier is thus brought into the vicinity of plates of a polarity opposite that of the carrier itself; the plates secured to the carrier—and in which the carrier is located in recess 36a—are necessarily of like polarity with the carrier, while the remaining plates—in which the carrier extends into recess 36c—are of the opposite polarity to that of the carrier. To avoid possibility of short-circuiting, due to this condition, the assemblage is arranged with insulating structures, a simple form of which is illustrated, each recess 36a and 36c each carrying an insulator 39a between the carrier and the bottom of the recess, the insulators for recesses 36a having openings to permit the passage of projection 36b. The insulator material 39a may be of the same material as the separators 39, presently referred to, and, for convenience, may be in the form of strips of such material extending lengthwise of the carrier and punched for the passage of the projections 36b. Since the material is fibrous, it can accurately fit the recess, and thus ensure the insulating characteristic that is desired.

In the assembly shown, the carrier 37, with its plate assembly, forms the negative electrode, while the carrier 38, with its plate assembly, forms the positive electrode. In the arrangement, the general practice of having the outermost plates as parts of the negative electrode is preferably followed, the number of plates used thus being an uneven number. For the purpose of illustrating the dimensional characteristics of the battery, it may be stated that the space available for the plate assembly is approximately 1 inch in diameter by approximately 3½ inches in length; the overall length of the battery is greater than this to permit accommodation for the vent assembly as presently described. Within the space referred to, the plate assembly, if the number of plates be 21, the plate surface area will approximate 30 square inches.

The plate assembly is completed by the use of separators. These may be of various materials. In this particular type of the battery, while the use of customary wood separators would be possible, the fact that the battery is practically a sealed battery with a definite amount of electrolyte would tend to render such separators of less value, due to the fact that when the lamp is inverted from the position shown in Figs. 1 and 2, for instance, the electrolyte would drain to the vent assembly portion of the battery, thus tending to drain the plate zone. Hence, with this type of battery, it is preferred to use separators having absorbent properties, such, for instance, as specially-treated asbestos sheet material, spun glass, bagasse felt, and the like. Of the latter, either may be employed, the separators being comparatively thin and cut to fit within the spaces between adjacent plates. The asbestos material is the more absorbent, but its efficiency will tend to deteriorate with use, so that the spun glass form may be found more satisfactory for the service. With the absorbent separators, a sufficient electrolyte will be trapped therein to maintain the light active over an extended period, even though the light be inverted. In the drawings the separators are indicated at 39.

The negative electrode 37 includes the end structure 37a a portion of which is in the form of the central projection 37b which extends through the closed end of the battery and constitutes the negative terminal of the battery. The carrier 38 forms part of the positive electrode, and, as indicated in Fig. 6, this carrier extends for approximately the full length of the interior of the battery, thus extending a considerable distance above the battery plate-assembly zone. The upper end of carrier 38 forms a support for the vent assembly which will now be described.

During the charging period of a rechargeable battery, the action within the battery tends to set up certain changes therein, these including a tendency to ebullition of the liquid and development of gases; the extent of this will depend somewhat upon the rate of charging, etc., but the condition is present to at least some extent whenever the battery is being charged. To prevent damage to the battery, the latter is provided with a vent arrangement which will permit escape of such gases as may develop, during this period without carrying the electrolyte with them. The necessity for the use of a vent for the purpose has led to the development of various forms of venting structures. Under usual conditions, where the battery is removed to a charging station, the venting feature is readily taken care of, but it becomes more difficult where the battery is being charged in service position. In the latter case, provision is made to permit venting during charging, but must also prevent escape of electrolyte while in service. Generally this is not difficult where the service retains the battery practically in the same position. Where, however, as is the case with the present service, the conditions are complicated by the fact that the battery assumes various positions—and many even be inverted—the problem is more difficult, since, in such cases, the battery may be placed in a position where the free electrolyte may gravitate to the venting zone. Where the battery is permanently sealed, as in the present type, it becomes essential to provide for a permanent vent, and at the same time prevent electrolyte escape in service when the battery is inverted. The condition is met in the present invention by the following structure:

40 designates a hollow casing which is secured to the upper end of carrier 38. The opposite ends of casing 40 are formed with openings, the upper wall in Fig. 8 presenting the opening at this end in the form of a tubular extension 41 having a length to extend through closure 35a, the projecting portion constituting the positive terminal of the battery; to permit escape of gases, the terminal is shown as provided with kerfs 41a located on a diameter of the terminal. The opposite end wall of casing 40 has its opening carried by a nipple 42 which is designed to receive one end of an elongated tubular member 43 which depends from the casing and which serves as a gas outlet. Member 43 may be of suitable material—rubber tubing treated for the service may be employed—the free end of the tube having a restricted opening 43a, the dimensions of which will permit gas to enter but will prevent the passage of the electrolyte therethrough. The tube is preferably arranged as shown in Fig. 9, with a return bend or "gooseneck" characteristic, this placing the end carrying opening 43a as extending upwardly or away from the plate zone. The positioning may be obtained in any desired way, a simple arrangement being by the use of a clip 44, this permitting the presence of a slight space between opposite flights of the tube to permit passage of any electrolyte which may tend to gravitate from the exterior of casing 40.

As will be understood from Figs. 1 and 2, the flashlight is positioned with the bulb end down during charging, thus placing the plate zone of the battery as the lower end of the latter in these views, thus corresponding to the position of this zone in Figs. 5 and 6. In this position, the electrolyte is entirely within the plate zone, leaving the venting assembly wholly above the electrolyte surface; hence, any gases which may be evolved during charging, will pass out of the interior of the battery through opening 43a, member 43, casing 40 and terminal 41. When the light is placed in service the bulb end may be pointed in any direction, the electrolyte tending to gravitate to the low point of the assembly, and hence may reach to the space occupied by the venting structure; when this occurs the electrolyte may cover opening 43a but the dimensions of the latter together with the particular shape of the tube 43 will prevent escape of the electrolyte.

Casing 40 provides an enlarged chamber to meet the possibility that gases may carry vapor with them in which case condensation of the vapor may take place on the walls of the chamber and gravitate downward into the return bend of "goose-neck" of the venting structure; the amount would be small even over the period of the expected life of the battery. Should this content not drain out of the tube 43, the gases during a charging period would force the entrained liquid back into the enlarged zone provided by this chamber of casing 43, and thus permit gas escape without loss of fluid. Any collection of electrolyte on the exterior of casing 43 will simply drain downward and drip off the venting structure when the light is placed in its charging position.

As will be understood, this structure provides an important advantage in that the venting structure not only serves as the vent, but also as the positive terminal of the battery, due to the fact that the venting structure is being carried by the carrier 38 itself a part of the positive electrode assembly. Consequently, there is no need for limiting the dimensions of the venting structure due to the restricted space conditions present; in addition, the arrangement is greatly simplified through elimination of the need for providing for separate terminal and venting conditions within this end of the battery chamber.

The alternative form of plate assembly is shown in Figs. 10 to 14, the battery, otherwise, being similar to that above described. In this form the plates extend longitudinally of the battery, and, as shown, are in the form of a pair of negative plates 45 spaced apart and connected at one end by a bridge 45a which carries the negative terminal 45b. The positive plate formation 46 is intermediate the two negative plates, the equivalent of carrier 38 being formed integral with plate 46 and having the extension 46a attached to the casing 40. The plates are separated by suitable spacers 47, which, in this form, may be the usual wood spacers, but are preferably of an absorbent material. If desired, a suitable holding element 48 in the form of an insulated element, may be placed about the upper end zone of the plate assembly to retain the plates in proper relation in this zone.

In practice, the volume of electrolyte used with either form would provide for efficient service. This volume would be such that when the light is inverted, the free electrolyte, while gravitating to the venting zone, would preferably not reach the level of opening 43a—the venting assembly is so arranged that a sufficient volume will be present without closing this opening when the battery is inverted. As pointed out, the battery is provided with the proper amount of electrolyte by the manufacturer, after which the battery is sealed and it is marketed in such form. As marketed, the battery is designed to be efficient for a lengthy period—a year, for instance, under daily use conditions—whereupon it would be replaced, at nominal cost, by a new battery, the manufacturer then re-conditioning the used battery. With a battery serviceable for such lengthy period, the assemblage of flashlight and its charging support enables the user to have efficient service without the requirement of special attention, other than that of the substitution of one battery for another at the end of the period, and, at the same time, enables the manufacturer to give any guarantee for effective service, since the supply and replacement of battery is wholly under his control because of the sealed condition of the battery, and therefore subject to his control as to structure and electrolyte control.

As indicated, one of the important features lies in the fact that the positive terminal of the battery is a part of the venting assembly. Through combining the two essential features into the single formation, economy of space is provided within the battery, through the fact that the venting assembly can be supported by the positive electrode instead of by the battery casing or vice versa. As a result, the venting assembly can be made of dimensions such as to enable an adequate supply of electrolyte to be employed without liability of loss through the venting assembly, and an assurance of an adequate candle-power service for extended periods due to the fact that the plate zone is of adequate dimensions for the purpose. While these detailed features are more or less specific to the battery itself, they co-operate in the complete assembly through the fact that they permit of battery dimensions such as are usable within a flashlight casing of dimensions similar to those of the commercial dry-cell type designed for similar duty.

For instance, in one of the forms of the present invention, the lamp bulb employed is of 1.93 volts, .5 amperage, and approximately .7 candle-power; with a battery of the type described, tests have shown efficient operation for ten to fifteen hours of continuous use of the flashlight before the candlepower drop becomes effective. In the commercial dry-cell type at least, two batteries in series are required, and these will not permit a similar length of continuous service without voltage and candlepower drop. In the latter form new batteries must be substituted; with the present invention, the flashlight is simply placed on its support assembly for re-charging.

Aside from the battery construction the lighting unit generally simulates the commercial flashlight of dry-cell type, so that the cost of production increase over that type is mainly due to the battery and support structures. While the cost per assembly is thus greater for the present invention, the maintenance cost is but a fraction of that of the commercial type, with the advantage of being more efficient in service. The initial battery cost is greater with the present invention, but being re-chargeable, its life exceeds that of many replacements of dry-cell batteries; replacement of batteries in the present invention would be at nominal cost due to the fact that batteries can be re-conditioned by the manufacturer, making possible substitution of batteries at low cost.

Either type of plate assembly disclosed herein may be employed. However, the form shown in Figs. 5 and 6 and 10 and 11 is preferred due to the fact that it provides for relatively large plate surface exposure within the space limitations. With the skeleton form of plate employed, the assembly can be readily produced.

While I have herein disclosed the complete invention disclosed in the parent application, the features of the latter are not claimed herein excepting as they relate to the battery assembly structures, the claims for the remaining features being found in such parent application.

While I have herein shown and described one or more ways of carrying out the objects of the invention and presented different forms for producing this result, it will be readily understood that variations, changes or modifications therein may be found desirable or essential in meeting the various exigencies of service or the individual desires of a customer, and I therefore desire it to be understood that I reserve the right to make any and all such changes and modifications therein as may be found desirable or essential insofar as the same may come within the spirit and scope of the invention as expressed in the accompanying claims.

I claim:

1. A battery unit of the rechargeable type adapted for service in lighting units of the flashlight type, wherein the flashlight presents the bulb and battery as in substantial axial alinement, and wherein the battery is adapted to be charged while in normal position within the unit, said battery comprising a tubular casing with one end carrying a removable closure and with a permanent closure at the opposite end, each closure being adapted to carry one of the terminals of the battery with the removable closure carrying the positive terminal, said casing and closures being of non-metallic material, a plate assemblage within a zone of the casing adjacent the permanently-closed end of the casing, and having a rigid element extending from such zone in the direction of the opposite closure, said element leading from and being included as a battery circuit lead within the positive side of the plate assembly, a venting unit positioned within a zone of the casing adjacent the removable closure, the venting unit being carried by such element of the positive side of the plate assembly, said venting unit presenting the positive terminal of the battery and electrically-connecting such rigid element with the terminal, such terminal being tubular to thereby provide venting means for the unit, said venting unit including a casing carrying the tubular positive terminal at one end carrying a goose-neck formation at its other end, the formation being located within the venting unit zone above the plate assembly zone of the battery casing, the goose-neck formation having a vent opening remote from the plate assembly zone to thereby permit free gas escape during charging.

2. A battery unit as in claim 1 characterized in that the venting unit casing is hollow and of enlarged internal dimensions to form a moisture trap and drain.

3. A battery unit of the rechargeable type adapted for service in lighting units of the flashlight type, wherein the flashlight presents the bulb and battery as in substantial axial alinement, and wherein the battery is adapted to be charged while in normal position within the unit, said battery comprising a tubular casing with one end carrying a removable closure and with a permanent closure at the opposite end, each closure being adapted to carry one of the terminals of the battery with the removable closure carrying the positive terminal, said casing and closures being of non-metallic material, a plate assemblage within a zone of the casing adjacent the permanently-closed end of the casing, and having a rigid element extending from such zone in the direction of the opposite closure, said element leading from and being included as a battery circuit lead within the positive side of the plate assembly, a venting unit positioned within a zone of the casing adjacent the removable closure, the venting unit being carried by such element of the positive side of the plate assembly, said venting unit presenting the positive terminal of the battery and electrically-connecting such rigid element with the terminal, said terminal being tubular to thereby provide venting means for the unit, said plate assembly including a succession of plates the metallic content of which is of similar skeleton configuration, and a pair of plate carriers differing as to length with one of such carriers constituting the rigid element of the positive side, said plates being symmetrically disposed relative to the battery axis and to the direction of length of the carriers, with adjacent plates secured to different carriers and with alternate plates secured to the same carrier, each plate including within its configuration a tongue pin adapted to be received and secured within an opening of its carrier.

4. A battery unit of the rechargeable type adapted for service in lighting units of the flashlight type, wherein the flashlight presents the bulb and battery as in substantial axial alinement, and wherein the battery is adapted to be charged while in normal position within the unit, said battery comprising a tubular casing with one end carrying a removable closure and with a permanent closure at the opposite end, each closure being adapted to carry one of the terminals of the battery with the removable closure carrying the positive terminal, said casing and closures being of non-metallic material, a plate assemblage within a zone of the casing adjacent the permanently-closed end of the casing, and having a rigid element extending from such zone in the direction of the opposite closure, said element leading from and being included as a battery circuit lead within the positive side of the plate assembly, a venting unit positioned within a zone of the casing adjacent the removable closure, the venting unit being carried by such element of the positive side of the plate assembly, said venting unit presenting the positive terminal of the battery and electrically-connecting such rigid element with the terminal, such terminal being tubular to thereby provide venting means for the unit, said plate assembly including a succession of plates the metallic content of which is of similar skeleton configuration, and a pair of plate carriers differing as to length with one of said carriers constituting the rigid element of the positive side, said plates being symmetrically disposed relative to the battery axis and to the direction of length of the carriers with adjacent plates secured to different carriers and with alternate plates secured to the same carrier, each plate being secured to its carrier by a pin and opening connection with the connection being by welding or its equivalent.

5. A battery unit of the rechargeable type adapted for service in lighting units of the flashlight type, wherein the flashlight presents the bulb and battery as in substantial axial alinement, and wherein the battery is adapted to be charged while in normal position within the unit, said battery comprising a tubular casing with one end carrying a removable closure and with a permanent closure at the opposite end, each closure being adapted to carry one of the terminals of the battery with the removable closure carrying the positive terminal, said casing and closures being of non-metallic material, a plate assemblage within a zone of the casing adjacent the permanently-closed end of the casing, and having a rigid element extending from such zone in the direction of the opposite closure, said element leading from and being included as a battery circuit lead within the positive side of the plate assembly, a venting unit positioned within a zone of the casing adjacent the removable closure, the venting unit being carried by such element of the positive side of the plate assembly, said venting unit presenting the positive terminal of the battery and electrically-connecting such rigid element with the terminal, such terminal being tubular to thereby provide venting means for the unit, said plate assembly including a succession of plates the metallic content of which is of skeleton formation, said plates being symmetrically disposed axially relative to the battery axis with the plate planes normal to such axis, alternate plates of the assembly being secured to such rigid element with the remaining plates secured to a separate rigid plate-carrying element of less length than such first mentioned rigid element and which forms a battery circuit lead to the negative terminal of the battery, the positive and negative terminals being located at opposite ends of the battery, each plate being secured to its carrying element and insulated from the other element and its neighboring plates, each plate having a peripheral recess for each plate-carrying element and each plate having means in one of its recesses operative with a plate-carrying element to provide its secured relation to such element, whereby the respective assemblage of carrying element and its plates may be assembled to complete the electrode system by bodily movement of one element and its plates laterally of and in the direction of the other element and its plates to thereby place the plates in overlapping relation and with the plates of one element staggered relative to the plates of the other element in the direction of length of the assemblage.

BENJAMIN D. EMANUEL.